(12) United States Patent
Arakelian

(10) Patent No.: US 8,733,779 B2
(45) Date of Patent: May 27, 2014

(54) JOCKEY WHEEL MOUNTING

(76) Inventor: Richard Arakelian, Arndell Park (AU)

( * ) Notice: Subject to any disclaimer, the term of this patent is extended or adjusted under 35 U.S.C. 154(b) by 0 days.

(21) Appl. No.: 13/445,951

(22) Filed: Apr. 13, 2012

(65) Prior Publication Data

US 2012/0261903 A1 Oct. 18, 2012

(30) Foreign Application Priority Data

Apr. 13, 2011 (AU) ................................ 2011901368

(51) Int. Cl.
*B60S 9/02* (2006.01)

(52) U.S. Cl.
USPC ........................................ 280/476.1; 280/475

(58) Field of Classification Search
USPC .............................................. 280/476.1, 475
See application file for complete search history.

(56) References Cited

U.S. PATENT DOCUMENTS

| | | | | |
|---|---|---|---|---|
| 4,176,853 A * | 12/1979 | Brock | ......................... | 280/423.1 |
| 5,040,937 A * | 8/1991 | Godbersen | ................... | 414/559 |
| 5,067,692 A * | 11/1991 | Nudd et al. | .................... | 254/420 |
| 5,263,735 A * | 11/1993 | Mann | ............................. | 280/512 |
| 6,302,381 B1 * | 10/2001 | Roll | .............................. | 254/425 |
| 6,439,545 B1 * | 8/2002 | Hansen | ......................... | 254/420 |
| 6,619,671 B1 * | 9/2003 | Fine | ................................. | 280/3 |
| 7,328,761 B1 * | 2/2008 | Tyler | ............................... | 180/13 |
| 7,494,154 B2 * | 2/2009 | Richards et al. | .............. | 280/767 |
| 7,621,356 B2 * | 11/2009 | Quarberg | ........................ | 180/12 |
| 7,976,051 B1 * | 7/2011 | Laster et al. | .................. | 280/477 |
| 2006/0042841 A1 * | 3/2006 | Russell | ........................... | 180/13 |

* cited by examiner

*Primary Examiner* — Kevin Hurley
*Assistant Examiner* — Michael Stabley
(74) *Attorney, Agent, or Firm* — Galbreath Law Offices, P.C.; John A. Galbreath

(57) ABSTRACT

A mounting (10) for a jockey wheel assembly has a first member (14), a second member (18) and a locking pin (32). A release handle (42) is connected at a first location to the locking pin (32) for drawing the locking pin (32) along a generally linear path and has a contact portion (52) remote from the first location. The contact portion (52) is for engagement with a bearing surface allowing the handle (42) to be rotated relative to the locking pin (32) about the first location whilst the contact portion (52) slides relative to the bearing surface.

28 Claims, 4 Drawing Sheets

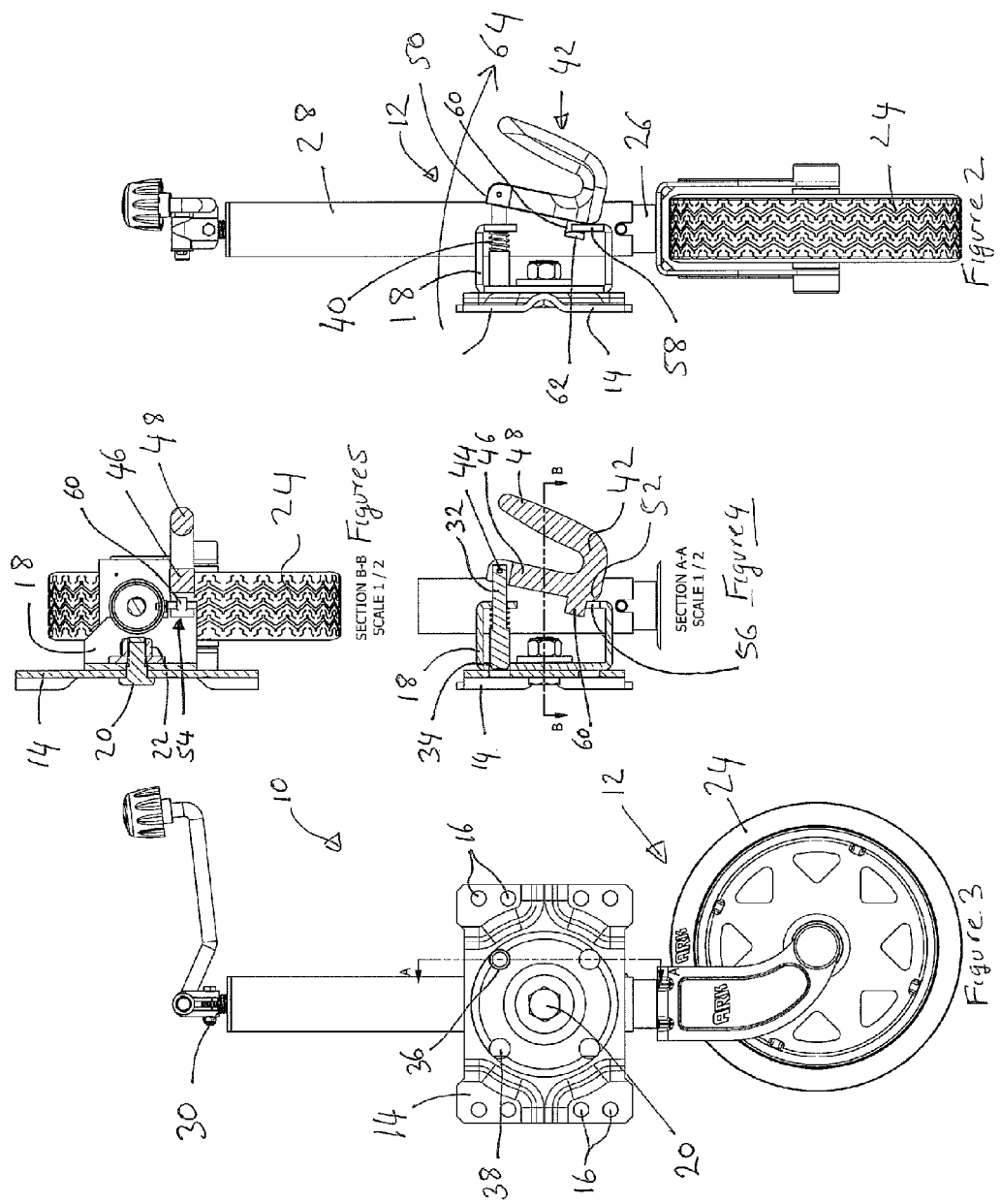

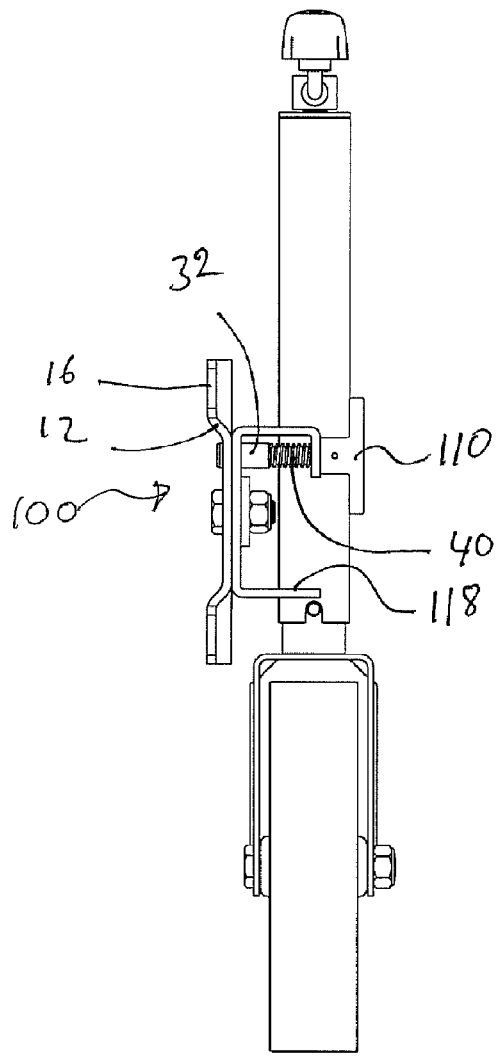
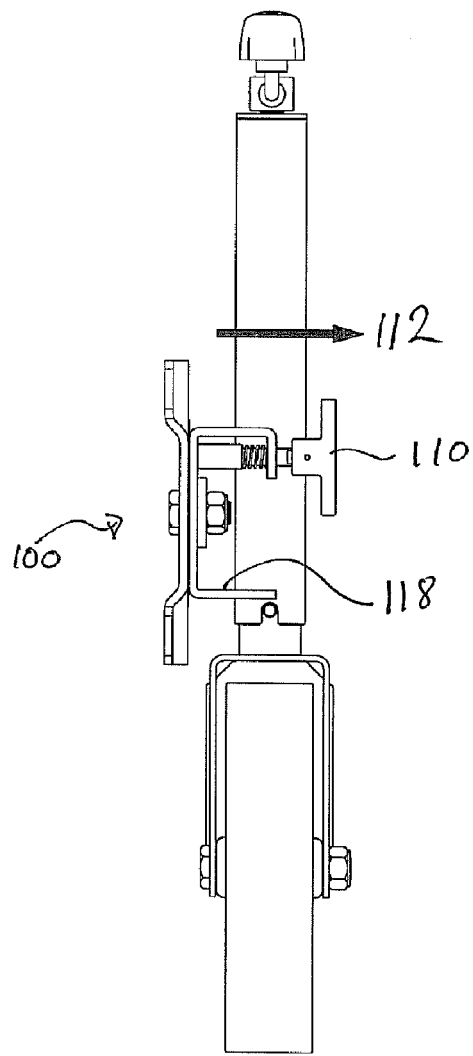
Figure 6
Figure 7

JOCKEY WHEEL MOUNTING

FIELD OF INVENTION

This invention relates to jockey wheels for towed vehicles, such as trailers and caravans and more particularly relates to improvements in mounting of the jockey wheel on the towed vehicle.

BACKGROUND

Light towed vehicles such as trailers and caravans frequently have a jockey wheel mounted on the draw bar to enable the vehicle to be maneuvered or leveled when not attached to a tow vehicle. For either of these the jockey wheel needs to contact the ground. However, when the towed vehicle is being towed it necessary that the jockey wheel is raised from the ground, so that bumps and similar protrusions do not damage the jockey wheel assembly.

A jockey wheel assembly may be provided with a mechanism that allows the vertical position of the wheel to be adjusted.

SUMMARY OF THE INVENTION

In one broad form the present invention provides a mounting for a jockey wheel assembly, the mounting including:
 a first member for attachment to a towed vehicle;
 a second member for connection to a jockey wheel assembly, the second member mounted to the first member for movement between first and second positions;
 at least one locking member movable between a first operative position in which it engages one or both of the first and second members and prevents movement of the second member relative to the first member and a second operative position in which it is disengaged at least one or both of the first and second members and does not prevent movement of the second member relative to the first member;
 at least one release handle connected to the at least one locking member for moving the at least one locking member from the first position to the second position;
 the at least one release handle connected to the at least one locking member for drawing the at least one locking member along a generally linear path between the first and second operative positions.

The locking member is preferably part of the assembly but may be a separate component attached to the towed vehicle.

Accordingly, in another broad form the invention provides a towed vehicle having:
 a mounting for a jockey wheel assembly mounted for movement between first and second positions;
 at least one locking member movable between a first operative position in which it engages the mounting and prevents movement of the mounting and a second operative position in which it is disengaged from the mounting and does not prevent movement of the second member;
 at least one release handle connected to the at least one locking member for moving the at least one locking member from the first position to the second position;
 the at least one release handle connected to the at least one locking member for drawing the at least one locking member along a generally linear path between the first and second operative positions,
 wherein the release handle is connected to the locking member at a first location and has a contact portion remote from the first location, the contact portion for engagement with a bearing surface, said engagement allowing the handle to be rotated relative to the locking member about the first location whilst the contact portion slides relative to the bearing surface.

The at least one release handle may be a straight pull type handle.

Preferably the at least one release handle is connected to the at least one locking member at a first location and has a contact portion remote from the first location, the contact portion for engagement with a bearing surface, said engagement allowing the handle to be rotated relative to the at least one locking member about the first location whilst the contact portion slides relative to the bearing surface, thereby drawing the at least one locking member along a generally linear path between the first and second operative positions Where the at least one handle engages with a bearing surface, the bearing surface may be part of the mounting or part of the towed vehicle.

The at least one release handle is preferably connected to the at least one locking member at the first location about an axis, such as by connection with a pin in a bore. However, the connection may be by way of a tab, arm or leg that engages in a slot or similar so as to allow more than just rotation about a fixed point.

The first and second positions of the second member may correspond to operative and storage positions of the jockey wheel assembly.

The second member may move between the first and second positions by rotation about an axis of rotation. Preferably, in use, the axis of rotation extends generally horizontally. Movement between the lowered and raised positions need not be by rotation and may be by linear other motion.

Where the second member moves between the first and second positions by rotation about an axis of rotation, the locking member may move between the first and second operative positions generally parallel to the axis of rotation or radially relative to the axis of rotation.

The release handle may include a first arm connected to the locking member and having a contact portion remote therefrom and a second arm extending from adjacent the contact portion. The release handle may be V shaped or U shaped, with locking member connected at or adjacent the free end of one arm and the contact portion at or adjacent the base of the V or U of the handle.

The handle may include a restraining portion that limits movement of the contact portion of the release handle along the direction of movement of the release pin. In one form the restraining portion includes an arm or slot that engages a corresponding slot or arm on another part of the assembly.

In one form the locking member is mounted on the second part and engages at least the first part. This may be reversed with the locking member mounted on the first part and engaging at least the second part. In the preferred form the locking member is mounted on either the first and second part and engages both the first and second part in the first operative position.

The foregoing features of the invention may be combined in any combination of features where features are not mutually exclusive.

The invention will be described with reference to the accompanying drawings which show non-limiting implementations of the invention.

BRIEF DESCRIPTION OF THE DRAWINGS

FIG. 2 shows a front view of the assembly of FIG. 1 in an unlocked position.

FIG. 3 shows a side view of the assembly of FIGS. 1 and 2.

FIG. 4 shows a cross section taken along lines AA in FIG. 3.

FIG. 5 shows a cross section taken along lines BB in FIG. 4.

FIG. 6 shows a front view of a mounting assembly for a jockey wheel according to a second implementation of the invention in a locked position.

FIG. 7 shows a front view of the assembly of FIGS. 4 in an unlocked position.

DETAILED DESCRIPTION OF PREFERRED AND OTHER EMBODIMENTS

Figure 1:
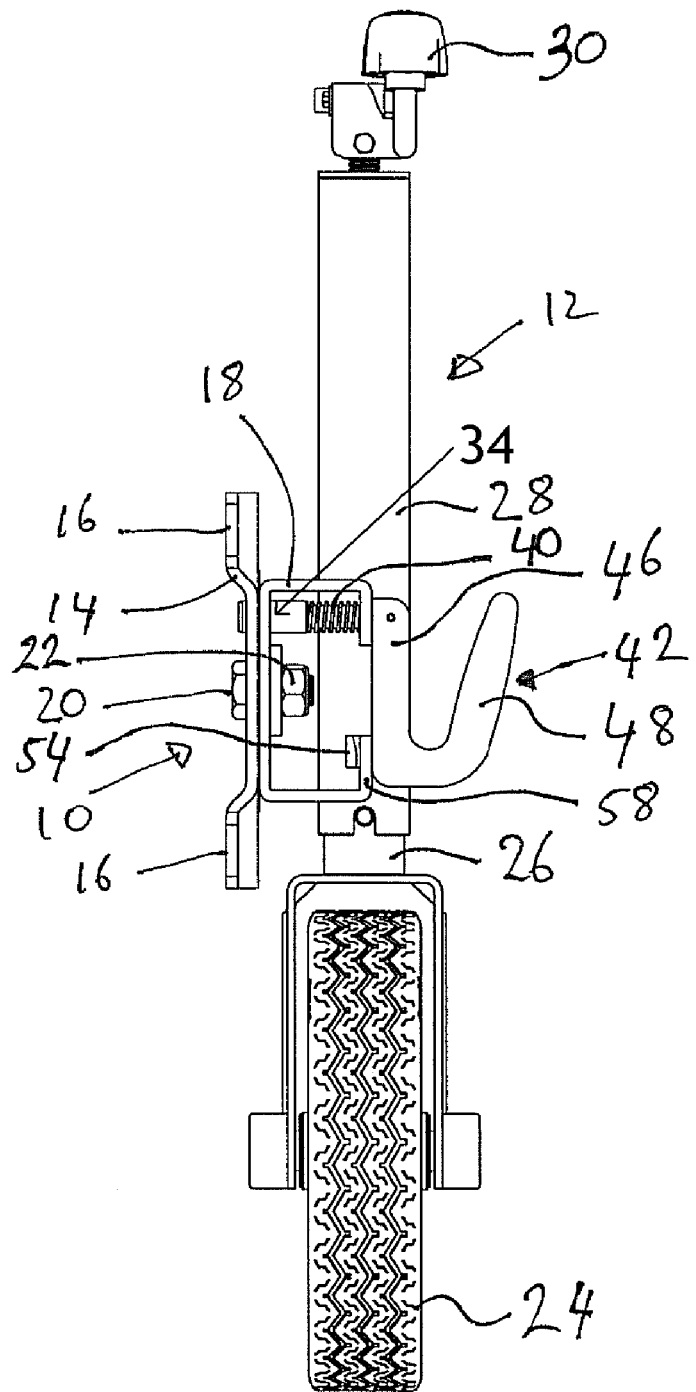
FIG. 1 shows a front view of a mounting assembly for a jockey wheel according to a first implementation of the invention in a locked position.

Referring FIGS. 1 to 5 there is shown a mounting 10 for a conventional jockey wheel assembly 12. The mounting 10 includes a mounting plate 14 adapted to be attached to a draw bar (not shown) of a towed vehicle, such as a trailer or caravan. In this implementation the mounting plate 14 has apertures 16 through which bolts or similar may pass to secure the mounting plate 14 to the draw bar. If desired these may be omitted and the mounting plate 14 may be permanently attached to the draw bar, such as by welding or similar.

A support bracket 18 is mounted to the mounting plate 14 by bolt 20 and nut 22 such that the support bracket 18 may rotate about the axis of bolt 20 relative to the mounting plate 14.

The conventional telescoping jockey wheel assembly 12 is connected to the support bracket 18. The assembly 12 includes jockey wheel 24 mounted on lower tube 26 that is telescopically received in upper tube 28, which in turn is connected to support bracket 18. The vertical position of the jockey wheel 24 may be adjusted by screw adjuster 30. The configuration of the jockey wheel assembly 12 is not a part of the invention and its configuration is not critical. Other arrangements may be used.

The rotational position of the bracket 18 relative to the mounting plate 14 is controlled by a spring loaded locking pin 32 that passes through aperture 34 in bracket 18 and into one of at least two apertures 36, 38 in the mounting plate 14. When the jockey wheel assembly 12 is vertical, as in FIG. 1, the pin 32 aligns and passes into aperture 36. When the jockey wheel assembly is horizontal the pin 32 aligns and passes into aperture 38. A spring 40 biases the locking pin 32 toward the mounting plate 14 so that when the bracket 18 is being rotated the pin will be urged into the apertures 36 or 38 as soon as it aligns with them.

Attached to the locking pin 32 is U or V shaped release handle 42. The release handle 42 has arms 46 and 48. Arm 46 is pivotally mounted to the locking pin 32 by pin 44 at one end 50 and extends generally perpendicular to locking pin 32. Arm 48 extends from the other end 52 of arm 46 and extends upwards at an angle. The handle 42 may be other configurations, such as a D shape with the second arm 46 being curving and extending back toward end 50. Remote from the pin 44 the other end 52 of the arm 46 engages another part of the bracket 18. This engagement allows that part of the arm 46 to apply a force against the bracket 18 but allows the handle 42 to rotate about that general area and also slide vertically.

In this implementation this engagement is achieved by providing the arm 46 with a T-shaped protrusion 54. The bracket 18 includes a vertically extending portion 58 with a slot 56 therein. The leg 60 of T shaped protrusion 54 is located in the slot 56 with the two arms 62 of the "T" sandwiching the portion 58 between themselves and the main part of arm 46. The arm 46 may bear against the portion 58. The arms 62 prevent the handle 42 swinging about pin 44 out of engagement with portion 58. This is not critical and if desired the bracket 18 may be provided with a simple plain bearing surface against which the lower end 52 of arm 46 may bear. The faces of arms 62 that oppose the portion 58 are preferably rounded or angled so as to aid in sliding of the handle relative to the bracket 18. It is not critical that the end region 52 of arm 46 engage the bracket 18 and engagement may be in-between the ends 50 and 52.

To remove locking pin 32 from engagement from mounting plate 14, the user grasps arm 48 and applies a pulling or rotating force, as indicated by arrow 64. The handle 42 rotates about the contact of the lower part 52 of arm 46 against bracket 18 with the free end 50 moving generally linearly along the axis of locking pin 32. Because the other end 52 is not connected to the bracket 18 by a fixed pivot point, as the handle is rotated it may move upwards to allow this linear motion to occur. In contrast, a fixed lower pivot point would cause the upper end 50 of arm 42 to follow a curved path. Unless the apertures through which locking pin 32 pass are oversize, this would result in jamming of the pin 32.

Once the locking pin 32 has been withdrawn from mounting plate 12, the bracket and jockey wheel assembly may be rotated to another position. As mentioned above, once the locking pin 32 aligns with a hole (36, 38) in mounting plate 14, spring 40 drives the pin 32 back into engagement with the mounting plate 14, assuming the user is no longer holding handle 42 in the retracted position as in FIG. 2.

By providing a "loose" pivoting arrangement the handle provides the advantage of a pivoting handle, i.e. reduced force to disengage the pin without the generation of significant side loads or looseness.

FIGS. 6 and 7 show a mounting 100 for a jockey wheel assembly according to a second implementation of the invention. The mounting 100 is substantially identical to the assembly 10 and so the same components are identified with the same numerals. The assembly 100 differs from the assembly 10 in the nature of release handle 110. In this implementation the release handle 110 is connected to the free end of locking pin 32. Disengagement of locking pin 32 from mounting plate 14 is achieved by a straight pull of the handle 110 in the axial direction of locking pin 32, as indicated by arrow 112. As such bracket 118, corresponding to bracket 18 of the first embodiment, does not require the arm 58 but is otherwise substantially identical.

The handle 112 may be a simple T shaped handle, as shown in the drawings, an L shaped handle, a pull ring, a solid ball or knob type handle or any other structure that allows the locking pin 32 to be withdrawn. The handle may be rigidly attached to the locking pin 32 or may be pivotally attached.

Whilst both implementations utilize a locking pin 32 that moves parallel to the axis of bolt 20, this is not critical and movement in other directions is possible. As an example the locking pin could move radially rather than axially and could engage the periphery of the mounting plate. Thus, for example, the mounting plate could be provided with an arcuate surface with two radially inward extending slots defining the lowered and raised positions. These could be arranged at 45 degrees either side of the vertical so that a user pulls up generally sideways in both positions.

Figure 8:
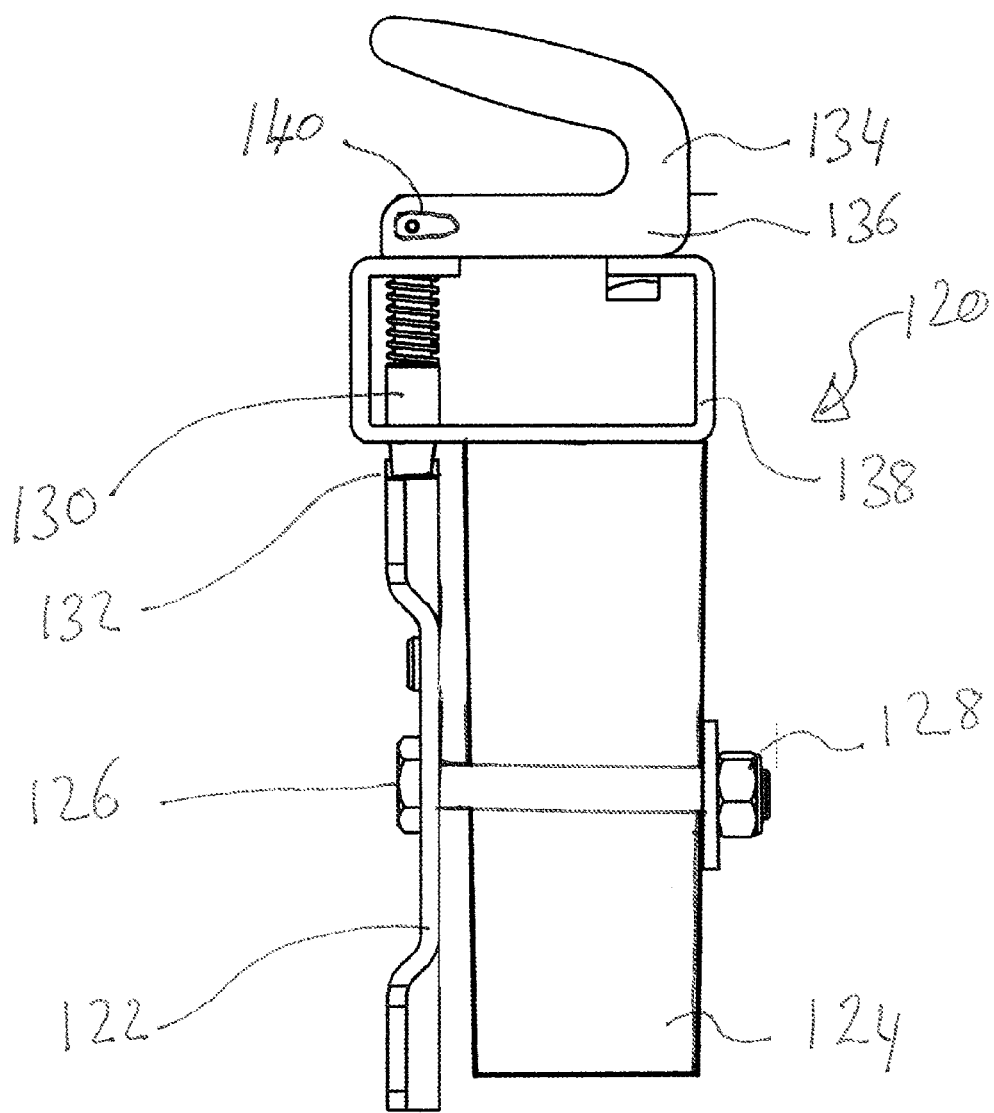
FIG. 8 shows a cross sectional view through a drawbar of a towed vehicle having a further variation of the invention.

FIG. 8 shows a mounting arrangement 120. In this arrangement a support bracket 122 for a jockey wheel assembly (not shown) is mounted to a draw bar 124 of the towed vehicle, via bolt 126 and nut 128. A spring loaded locking pin 130 is arranged move generally radially relative to the axis of rotation and is engaged in one of two slots 132 in mounting 120, corresponding to raised and lowered positions of the jockey wheel. Release handle 134 is connected to pin 130 and has a portion 136 that engages a bracket 138 mounted on or formed as part of the draw bar 124 in a similar manner to that of FIGS. 1 to 5. The bracket 138 may be formed integrally with the towed vehicle or may be permanently attached to the towed vehicle, such as by welding. Alternatively, the bracket may be a separate component bolted or otherwise semi permanently connected to the draw bar. Accordingly, the release handle can be considered to bear against a part of the towed vehicle. The connection of the release handle 134 with locking pin 132 need to be a fixed pivot point and, as shown, one of the two components may have a slot 140 in which a portion of the other is located. This allows motion of the release handle relative to the locking member such that the motion includes rotation and at least a second component.

The features of the invention described or mentioned in this document may be combined in any combination of features where features are not mutually exclusive.

It will be apparent to those skilled in the art that many obvious modifications and variations may be made to the embodiments described herein without departing from the spirit or scope of the invention.

I claim:

1. A mounting for a jockey wheel assembly, the mounting including:
    a first member for attachment to a towed vehicle;
    a second member for connection to a jockey wheel assembly, the second member mounted to the first member for movement between first and second positions;
    at least one locking mechanism including
        a locking member movable between a first operative position in which it engages one or both of the first and second members and prevents movement of the second member relative to the first member and a second operative position in which it is disengaged from at least one or both of the first and second members and does not prevent movement of the second member relative to the first member,
        and
        a release handle connected to the at least one locking member for moving the at least one locking member from the first position to the second position along a generally linear path between the first and second operative positions,
    wherein the release handle is connected to the locking member at a first location and has a contact portion remote from the first location, the contact portion for engagement with a bearing surface, said engagement allowing the handle to be rotated relative to the locking member about the first location whilst the contact portion slides relative to the bearing surface,
    wherein the release handle includes a restraining portion that limits movement of the contact portion of the release handle along the direction of movement of the locking member and
    wherein the restraining portion includes an extension or slot that engages a corresponding slot or extension on another part of the mounting.

2. The mounting of claim 1 wherein the release handle includes a first arm and the locking member is connected at or adjacent one end of the arm and the contact portion is at or adjacent the other end of the arm.

3. The mounting of claim 2 wherein the release handle includes a second arm extending from adjacent the contact portion.

4. The mounting of claim 3 wherein the second arm defines a V, U or D shaped release handle with the first arm.

5. The mounting of claim 1 wherein the release handle is connected to the locking member at the first location about an axis.

6. The mounting of claim 1 wherein the locking member is a separate component attached to the towed vehicle.

7. The mounting of claim 1 wherein, the bearing surface is part of the mounting or part of the towed vehicle.

8. The mounting of claim 1 wherein the second member moves between the first and second positions by rotation about an axis of rotation and the locking member moves between the first and second operative positions generally radially relative to the axis of rotation.

9. A mounting for a jockey wheel assembly, the mounting including:
    a first member for attachment to a towed vehicle;
    a second member for connection to a jockey wheel assembly, the second member mounted to the first member for movement between first and second positions;
    at least one locking mechanism including
        a locking member movable between a first operative position in which it engages one or both of the first and second members and prevents movement of the second member relative to the first member and a second operative position in which it is disengaged from at least one or both of the first and second members and does not prevent movement of the second member relative to the first member,
        and
        a release handle connected to the at least one locking member for moving the at least one locking member from the first position to the second position along a generally linear path between the first and second operative positions,
    wherein the release handle is connected to the locking member at a first location and has a contact portion remote from the first location, the contact portion for engagement with a bearing surface, said engagement allowing the handle to be rotated relative to the locking member about the first location whilst the contact portion slides relative to the bearing surface,
    wherein one of the release handle and the locking member includes a leg that engages in a slot in the other of the release handle and the locking member so as to allow motion of the release handle relative to the locking member such that the motion includes rotation and at least a second component.

10. The mounting of claim 9 wherein the release handle includes a restraining portion that limits movement of the contact portion of the release handle along the direction of movement of the locking member.

11. The mounting of claim 10 wherein the restraining portion includes an extension or slot that engages a corresponding slot or extension on another part of the mounting.

12. The mounting of claim 9 wherein the release handle includes a first arm and the locking member is connected at or adjacent one end of the arm and the contact portion is at or adjacent the other end of the arm.

13. The mounting of claim 12 wherein the release handle includes a second arm extending from adjacent the contact portion.

14. The mounting of claim 13 wherein the second arm defines a V, U or D shaped release handle with the first arm.

15. The mounting of claim 9 wherein the release handle is connected to the locking member at the first location about an axis.

16. A towed vehicle having:
a mounting for a jockey wheel assembly, mounted to the first member for movement between first and second positions;
at least one locking member movable between a first operative position in which it engages the mounting and prevents movement of the mounting and a second operative position in which it is disengaged from the mounting and does not prevent movement of the mounting;
at least one release handle connected to the at least one locking member for moving the at least one locking member from the first position to the second position;
the at least one release handle connected to the at least one locking member for drawing the at least one locking member along a generally linear path between the first and second operative positions,
wherein the release handle is connected to the locking member at a first location and has a contact portion remote from the first location, the contact portion for engagement with a bearing surface, said engagement allowing the handle to be rotated relative to the locking member about the first location whilst the contact portion slides relative to the bearing surface,
wherein one of the release handle and the locking member includes a leg that engages in a slot in the other of the release handle and the locking member so as to allow motion of the release handle relative to the locking member such that the motion includes rotation and at least a second component.

17. The vehicle of claim 16 wherein the release handle includes a restraining portion that limits movement of the contact portion of the release handle along the direction of movement of the locking member.

18. The vehicle of claim 17 wherein the restraining portion includes an extension or slot that engages a corresponding slot or extension on another part of the assembly.

19. The vehicle of claim 16 wherein the restraining portion includes an extension or slot that engages a corresponding slot or extension on another part of the assembly.

20. The vehicle of claim 19 wherein the release handle includes a first arm and the locking member is connected at or adjacent one end of the arm and the contact portion is at or adjacent the other end of the arm.

21. The vehicle of claim 20 wherein the release handle includes a second arm extending from adjacent the contact portion.

22. The vehicle of claim 16 wherein the second arm defines a V, U or D shaped release handle with the first arm.

23. A towed vehicle having:
a mounting for a jockey wheel assembly, mounted to the first member for movement between first and second positions;
at least one locking member movable between a first operative position in which it engages the mounting and prevents movement of the mounting and a second operative position in which it is disengaged from the mounting and does not prevent movement of the mounting ;
at least one release handle connected to the at least one locking member for moving the at least one locking member from the first position to the second position;
the at least one release handle connected to the at least one locking member for drawing the at least one locking member along a generally linear path between the first and second operative positions,
wherein the release handle is connected to the locking member at a first location and has a contact portion remote from the first location, the contact portion for engagement with a bearing surface, said engagement allowing the handle to be rotated relative to the locking member about the first location whilst the contact portion slides relative to the bearing surface,
wherein the release handle includes a restraining portion that limits movement of the contact portion of the release handle along the direction of movement of the locking member, and
wherein the restraining portion includes an extension or slot that engages a corresponding slot or extension on another part of the assembly.

24. The vehicle of claim 23 wherein the release handle includes a first arm and the locking member is connected at or adjacent one end of the arm and the contact portion is at or adjacent the other end of the arm.

25. The vehicle of claim 24 wherein the release handle includes a second arm extending from adjacent the contact portion.

26. The vehicle of claim 25 wherein the second arm defines a V, U or D shaped release handle with the first arm.

27. The vehicle of claim 23 wherein the release handle is connected to the locking member at the first location about an axis.

28. The vehicle of 23 wherein the second member moves between the first and second positions by rotation about an axis of rotation and the locking member moves between the first and second operative positions generally radially relative to the axis of rotation.

* * * * *